April 2, 1957 W. G. SCHEPMAN ET AL 2,787,532
ACETYLENE GENERATING APPARATUS
Filed July 7, 1953 3 Sheets-Sheet 2
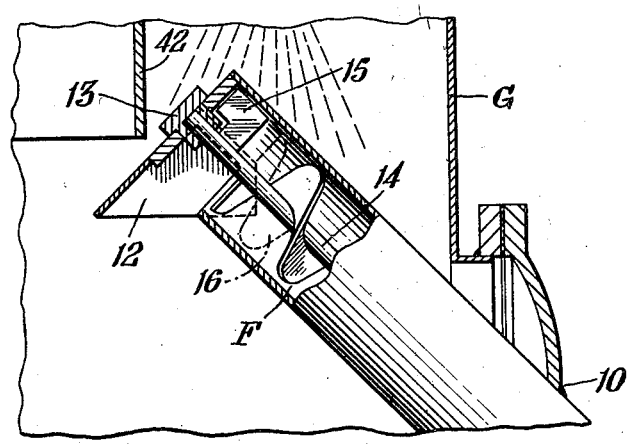
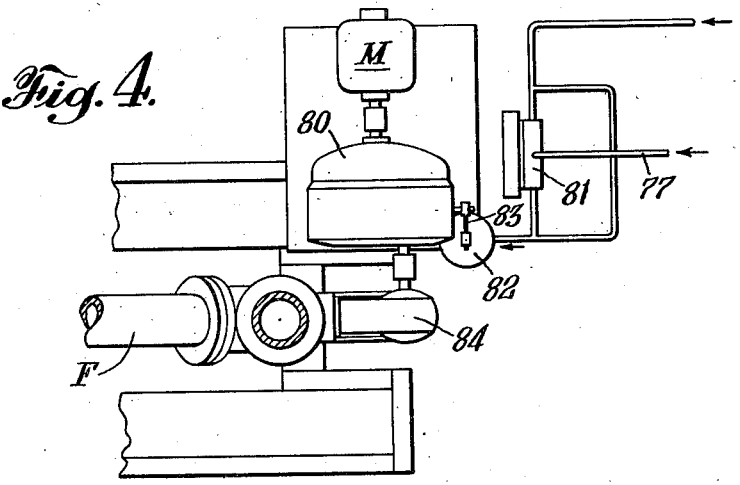
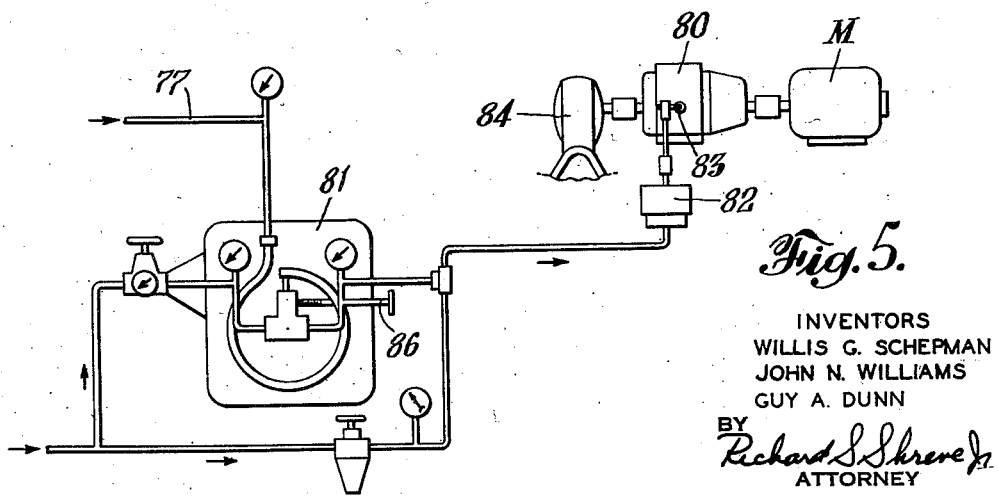
INVENTORS
WILLIS G. SCHEPMAN
JOHN N. WILLIAMS
GUY A. DUNN
BY
Richard S. Shreve Jr.
ATTORNEY

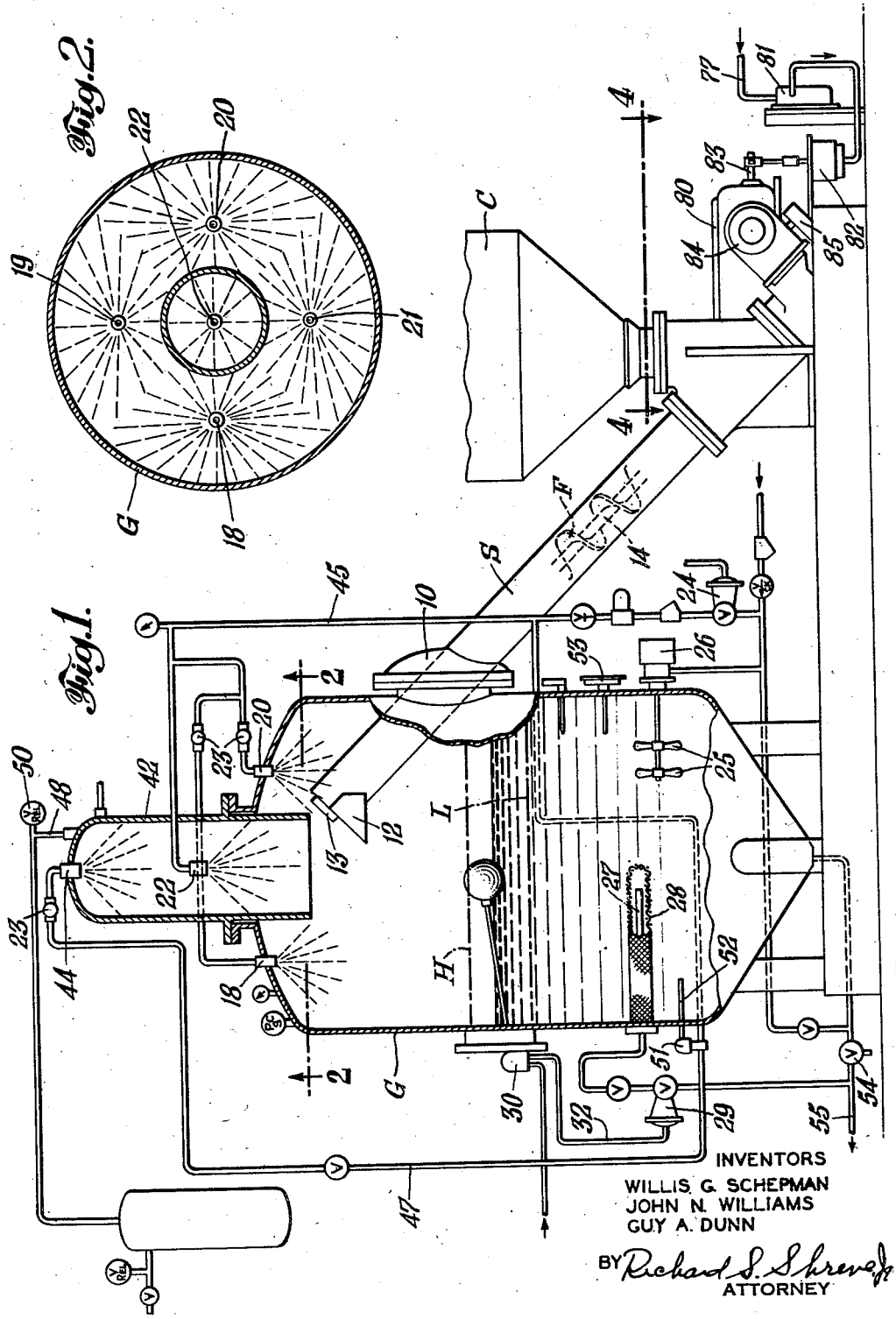

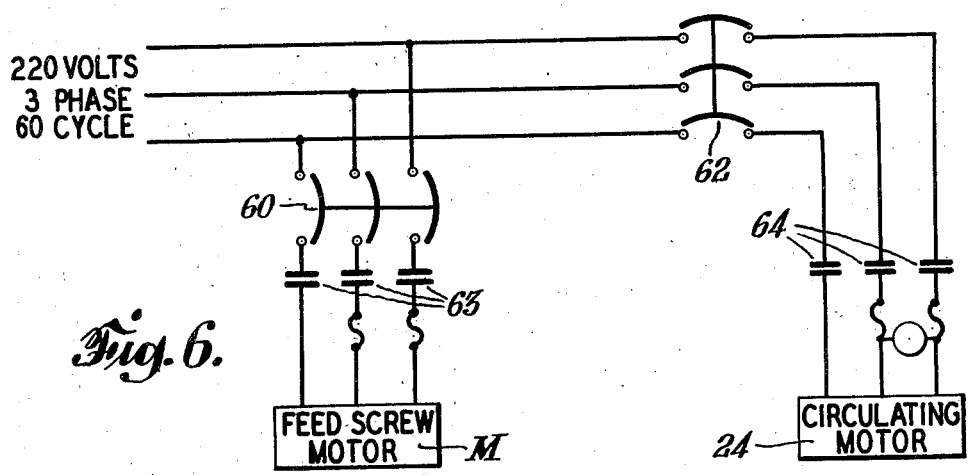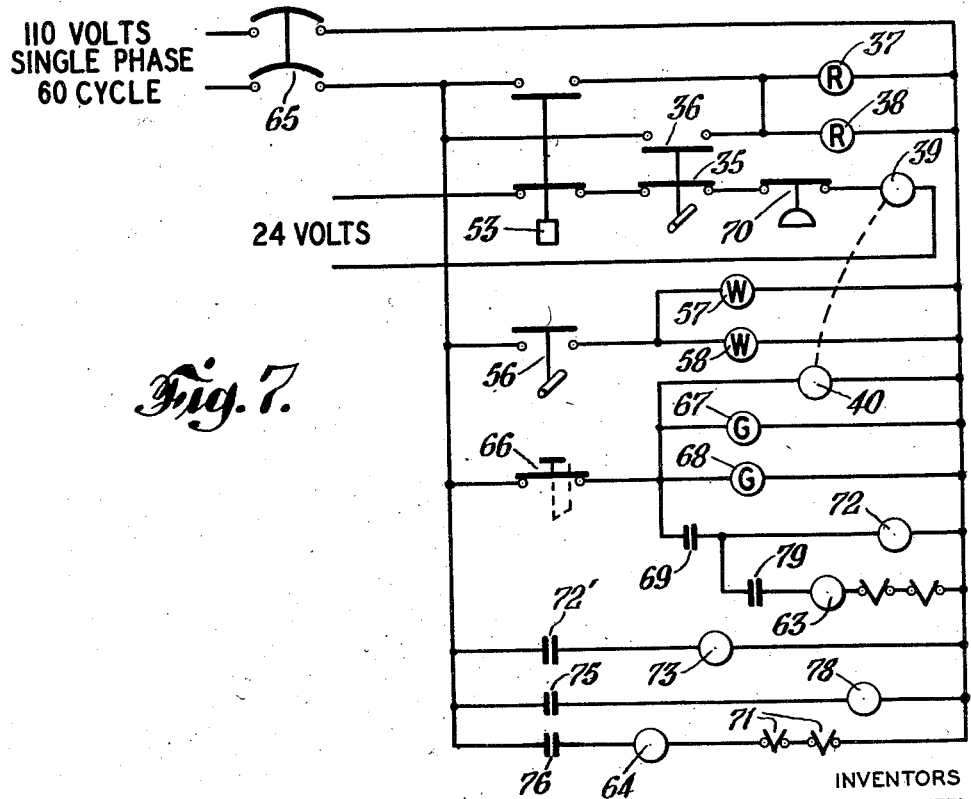

United States Patent Office 2,787,532
Patented Apr. 2, 1957

2,787,532
ACETYLENE GENERATING APPARATUS

Willis G. Schepman and John N. Williams, Indianapolis, and Guy A. Dunn, Martinsville, Ind., assignors to Union Carbide and Carbon Corporation, a corporation of New York Application July 7, 1953, Serial No. 366,554

2 Claims. (Cl. 48—54)

This invention relates to gas generation, and more particularly to method and apparatus for generating gas by feeding gas-forming material into liquid at a rate within the capacity of the apparatus sufficient to maintain a desired pressure of the generated gas.

It is customary to furnish acetylene to large industrial users by generating the gas on the premises and then distribute it through a pipe line system to the various locations where acetylene is consumed. The generating equipment commonly in use produces acetylene by the reaction of calcium carbide in water, with the fluid suspension of slaked lime as a residual product disposed to waste. For large users of acetylene, such a generating plant commensurate with the needs of the installation is an important consideration, more so with the increasing usefulness of large quantities of acetylene in processing materials and as a raw material in the chemical industry.

Objects of the present invention are to obtain the maximum output consistent with physical limitations and good operating practices, to provide safe generation at relatively high gas output rates from a given size installation, to reduce capital investment and manufacturing cost, and to provide a compact generator to supply a continuous source of medium pressure acetylene generated from calcium carbide to be transported and handled in the most economical type of package.

In acetylene generators heretofore employed, calcium carbide has been supplied by a hopper located above a feeding mechanism, and the feeding mechanism has been located above the generator. For the size of equipment necessary to give a desired output, the combined overall height has required a two-story building to house the apparatus. For serving the high location of the carbide hopper, traveling cranes have been provided, which further increase the height and also the area of building required.

It is therefore another object of the present invention to reduce the overall height of the generating equipment, particularly to permit the same to be housed in a one-story building, and to provide a compact generating unit in which the generator hopper and feed mechanism form a skid mounted packaged unit which can be transported and installed in a few days.

With some of the foregoing objects in view, a submerged feed gas bell was proposed, with the outlet of the feed screw located below the normal water level in the generating chamber. But safety is of prime consideration in the development of gas generators for producing acetylene, and it was considered that with this arrangement a sudden abnormal pressure rise resulting from improper operation or lack of adequate maintenance might inject water through the feed screw housing and into the carbide hopper. Accordingly, provision was made for adequately relieving extremely rapid pressure surges and absolutely preventing injection of water into the carbide hopper.

However, it is another object of the present invention to do away with the submerged feed gas bell and to provide other means for reacting the carbide with water without undesirable formation of islands of carbide or collections of fine carbide particles that could cause localized overheating with possible decomposition of the gas.

Another object of the invention is to provide a continuously controlled feed of dry carbide laterally into the generating chamber, with water sprays so located to provide complete coverage of the generating zone with sufficient water to prevent dangerous localized overheating or formation of islands of carbide and to substantially cool the generated acetylene before it leaves the generator.

In the drawings:

Fig. 1 is a side elevation, partly in vertical section, of an acetylene plant for carrying out the process, and embodying the apparatus, both according to the preferred embodiment of the present invention;

Fig. 2 is an inverted cross section through the gas space of the generating chamber, showing the water sprays;

Fig. 3 is an enlarged detailed section showing the structure at the outlet of the carbide feed screw;

Fig. 4 is a plan view of the variable speed mechanism for the carbide feed screw;

Fig. 5 is a diagram of the control unit for the variable speed mechanism;

Fig. 6 is a wiring diagram for the feed motor and circulating motor; and

Fig. 7 is a diagram of the control circuit.

Referring to the drawing in general, the dry gas-forming material such as calcium carbide is supplied by a hopper C disposed laterally and below the level of the top of the generator G. The outlet at the bottom of the hopper C is near the floor level. A conveyor, such as a feed screw F driven by a motor M feeds the calcium carbide from the hopper C through a gas tight, liquid free conduit S laterally and upwardly through the side of the generator G to a point substantially above the high water level H.

The carbide conduit S is joined to the water shell G in pressure tight relation as at 10. The upper end of the conduit S shown in Fig. 3 is provided with a water shield 12 which serves to prevent falling water from entering the conduit S. The shield 12 is constructed with a lubricating bearing 13 to support the upper end of the feed screw shaft 14. A sweeper blade 15 attached to the upper end of the feed screw shaft 14 keeps the outlet of conduit S free of accumulations of calcium carbide or calcium hydroxide.

The upper end of the carbide feed screw F terminates substantially below the outlet of conduit S to more evenly regulate the rate of carbide falling from conduit S by gravity into the generator G. Without this arrangement, the rotating feed screw F tends to deliver carbide through the outlet of conduit S in batches of sufficient magnitude as to cause undesirable pulsations in the generator pressure. Further improvement in the uniform feeding of carbide may be gained by adding one or more short helical conveyor flights 16 in equally spaced relationship at the upper end of the conveyor screw F on shaft 14.

Lump carbide falling from the outlet of conduit S submerges in the water in generator G and quickly reacts to produce acetylene and calcium hydroxide. The reaction zone of carbide smaller in size than commercial ¼" x ½" carbide tends to become localized at the surface of the water, and dust carbide is subject to the hazard of island formation with attendant pressure surges and possible overheating to the point of decomposition of the acetylene generated. To overcome this condition, suitable water sprays 18, 19, 20, 21 and 22 are located in spaced relationship, as shown in Fig. 2, in the gas space above the high water level H to completely cover the generating zone with water spray. The sprays are provided with visual flow indicators 23 and the water supply valve 24 is automatically operated to be open at all times when the feed screw motor M is running.

Calcium carbide not immediately and completely reacted by the sprays 18 to 22 is prevented from accumulating in the residue at the bottom of the generating chamber G by the tandem propellers 25 driven by a motor 26 which direct a continuous tangential stream of water to keep the entire carbide-lime-water mass in a constant turbulent whirlpool. This action also helps to equalize the water temperature and prevent stratification of a high temperature zone at the level of water in generating chamber G.

The excess residue-containing water is discharged from the chamber G through an outlet 27 in the lower portion of the water shell G covered by a removable screen 28, when the water rises to the high operating level H, by means of an automatic float controlled valve 29. The screen 28 prevents lumps of carbide or other solid material from entering the valve 29. When the water level recedes to the low operating level, the automatic float control valve 29 closes. In the form shown, the float actuates an air pilot valve 30 which controls the supply of compressed air through the pilot line 32 leading to the operating diaphragm of the valve 29.

The float shaft which actuates air pilot valve 30 also actuates electric micro-switches 35 and 36 shown in Fig. 7 which will turn on the red signal lights 37 and 38 and open the circuit through holding coil 39 to stop the operation of the generator if for any reason the water level in generating chamber G rises above the high water level H or falls below the low water level L.

Mounted on top of the water shell G is a gas cooler 42 which receives acetylene from the gas space above the water level in generator G. Mounted in the gas cooler 42 are spray nozzles 22 and 44 through which water is supplied by inlet pipes 45 and 47. From the cooler 42, the acetylene passes out through an outlet pipe 48 through a hydraulic back pressure valve 50 to a pipe line, cylinder charging station, or other service line or distribution system.

All of the water for the reaction is supplied by overhead sprays. The water supplied through the spray 44 by the inlet pipe 47 constitutes a substantial portion of the make-up water for the generator and is controlled by a temperature responsive regulator 51 comprising a diaphragm actuated valve in pipe 47, the diaphragm of which is connected for conducting volatile liquid from a thermostat 52 located in the shell G. By this means a relatively constant water temperature is maintained. Sprays 18 to 22 furnish the water necessary to completely wet the gas generating zone and are in constant operation at all times that the carbide feed screw F is running. When the water level in the generator G rises to the high level H, the excess water is discharged by the float controlled automatic valve 29 until the water level reaches the low level L when the valve 29 shuts off. A high temperature limit switch 53, shown in Fig. 7, with the thermostat extending into the water chamber below the low water level L in generator G, is arranged to turn on the red signal lights 37 and 38 and open the circuit through holding coil 39 to stop the operation of the generator if the water temperature rises above a predetermined upper limit.

Only the slow settling lime in the carbide residue will drain off with the excess water through the residue screen 28 and the automatic drain valve 29. Fast settling lime and heavy particles of foreign matter, such as ferrosilicon which sometimes contaminates calcium carbide, tends to accumulate in the bottom of the generator G. This residue must be periodically discharged from the bottom of the generator through the manually operated valve 54 which leads to the common residue discharge line 55.

An electric micro-switch 56, shown in Fig. 7, actuated by the water level float in the generator, is arranged to turn on the white signal lights 57 and 58 when the water level falls to slightly above the low water level L during the manual operation of draining the residue from the bottom of generator G, to warn the operator to close the drain valve 54.

The wiring diagram for the various electric switches controlling the operation of the generator G is shown in conventional schematic manner in Fig. 6. The carbide feed screw motor M and the water circulating motor 24 are connected to a common 220–240 volt, three-phase, electric power supply with manually operable circuit breakers 60 and 62 succeeded by magnetic control switches 63 and 64. Most of the control elements are separately powered from a 110–120 volt, single phase supply through manually operable circuit breaker 65.

When the generator is in operating condition, properly filled with water, and charged with carbide, the power supplies are connected by closing the manual switches 60, 62 and 65. Manual closing of the push-button switch 66 energizes the green signal lights 67 and 68 and also excites the transformer relay coil 39 which induces current to flow through the low voltage secondary coil 40 of the transformer relay when temperature switch 53, float switch 35, and pressure switch 70 are all in closed position. Magnetic repulsion between the relay transformer coils results in movement of the low voltage coil 40 which closes the switch contactors thereof 69 to energize the holding coil of time delay relay 72. Closure of the switch contactors 72' of the time delay relay energizes the holding coil of magnetic switch 73 which operates two sets of contactors 75 and 76. One of the switches 76 closes to energize the holding coil of the magnetic starter 64 which closes contactors and starts the water circulating motor 24. The other set of contactors 75 closes to energize the solenoid air valve 78 which controls the water supply valve 24, Fig. 1, to turn on the water to generator G.

When the water circulating motor 24 starts, the holding coil of magnetic switch 79 is energized to close the contactors thereof. This permits current to flow through the holding coil of the magnetic starting switch 63 to close the contactors thereof and start the carbide feed screw motor M. This interlocking arrangement prevents starting of the carbide feed screw motor M before the water circulating motor 24 is running because the magnetic switch 79 and the transformer relay switch 69 must both be closed to energize the holding coil of the carbide feed screw motor switch 63. The water circulating motor 24 will not operate until the time delay relay switch 72 is closed to turn on the water and energize the holding coil of motor starting switch 64. Overloading of motor 24 with consequent opening of the thermal overload contactors 71 will automatically stop the carbide feed screw motor M.

The low voltage transformer relay coil 40 which operates the switch 69 is connected in series with the high temperature limit switch 53, the high and low water level limit switch 35, and the generator pressure switch 70. As long as the latter three switches are all closed, the low voltage coil is energized to close switch contactors 69 when the push-button 66 is closed. Under these conditions the water circulating motor 24 and the carbide feed screw motor M will both start when the push-button switch 66 is closed and the time delay relay switch 72 turns on the water.

The holding coil which operates the time delay switch 72 is connected in parallel with the holding coil of the feed screw motor magnetic switch 60 so that closure of switch 72 will open the solenoid valve 78 controlling the supply of water to the generator at the same time that the carbide feed screw motor starts operating. When the feed screw motor is stopped by operation of any of the controls, the time delay relay switch 72 does not shut off the water supply until after a predetermined period of time has elapsed.

An important function of the controls is to automatically stop the operation of the generator under abnormal conditions, e. g., when the generator pressure rises too high, when the level of the water in the generating chamber gets too high or too low, and when the temperature of the water in the generator gets too high. The usual thermal overload protection is provided in the motor switches 63 and 64 with the added feature that failure of the water circulating motor will also stop operation of the carbide feed screw and shortly thereafter shut off the water supply to the generator. The delayed action of switch 72 permits water to spray into the generating chamber for a brief period to cool the volume of gas generated after the feeding of carbide stops, and also to insure that all the carbide in the generator is wetted down and submerged.

Referring to Figs. 4 and 5 the carbide feed screw motor M is connected to a variable speed drive 80 which in turn drives the carbide feed screw F. The variable speed drive 80 is controlled by the acetylene pressure in generator G through line 77 actuating a conventional pressure controller 81, regulating the air supply to an air piston 82 arranged with mechanical linkage to the positioning lever 83 of the variable speed drive 80. Power from the variable speed drive 80 is transmitted to the carbide feed screw F through the worm gear speed reducer 84 and chain drive 85 (Fig. 1).

The pressure controller 81 is provided with a manual pressure setting adjustment 86 for setting the controller to maintain the desired acetylene pressure in generating chamber G. If the generator pressure tends to fall, the controller 81 regulates the variable speed drive 80 to speed up the carbide feed screw F so that feeding of carbide is adjusted to the rate necessary to supply the increased acetylene load at the desired generator pressure. If the rate of acetylene consumption is decreased, the generator pressure tends to rise and then the controller 81 regulates the variable speed drive 80 to slow down the carbide feed screw F to reduce the rate of feeding of carbide in accordance with the decreased acetylene load. When the rate of acetylene consumption falls below the rate of generation corresponding to the lowest continuous rate of carbide feed afforded by the minimum speed of the variable speed drive unit 80, operation of the carbide feed screw becomes intermittent since the generator pressure will rise to such a value that the pressure switch 70, Fig. 7, will open and stop the feed screw motor M. Continued operation of the generator at such a low rate of acetylene consumption results in start-stop operation of the feed screw motor M within the range of pressure fluctuation necessary to close and open the pressure switch contactors 70, Fig. 7.

The generator according to the present invention when employed for the generation of acetylene, is a high capacity medium pressure generator, capable of producing 2,000 to 9,000 cubic feet of acetylene per hour. The average volume of water in the generator is approximately 225 gallons. When the regulator 51 is set to maintain the operating temperature of 160° F. in the generating chamber, it starts to open at approximately 140° F. to provide efficient scrubbing over a rather wide range of operation. When the output drops below 2,000 cubic feet of acetylene per hour, the operation becomes intermittent as described.

We claim:

1. Apparatus for generating gas by reacting a dry gas forming material with a liquid which comprises a gas and liquid tight shell for holding a relatively large confined body of the liquid having a free surface at an operating level and extending over the internal cross sectional area of said shell and a quantity of product gas occupying the space in said shell above said free surface; means including a controlled liquid discharge for maintaining said liquid operating level between predetermined limits; means confining and supplying a dry gas-forming material positioned adjacent to said shell and below said operating level; material feeding means comprising a feed screw within a feed conduit connected to the bottom of the material supplying means, extending laterally and upwardly through a gas and liquid sealed aperture in the side of said shell to an upper end within the shell above said operating level, and having a discharge opening at said upper end, for feeding the gas-forming material laterally and upwardly along an inclined path and discharging same directly into the gas space to drop onto said free surface of liquid; said feed screw terminating with its upper end below said discharge opening in the feed conduit for cooperation with the inclination thereof to provide smooth discharge of material; a sweeper blade at the upper end of said feed screw to be moved thereby for sweeping material from the interior upper end of the feed conduit and out the discharge opening thereof; a liquid shield mounted over said discharge opening of said feed conduit; liquid spraying means at the upper end of said shell above the upper end of said feed conduit for projecting sprays of reactant liquid downwardly through said quantity of product gas onto said free liquid surface in substantially uniformly distributed relation to douse and submerge floating particles of said material; said liquid shield being positioned and constructed to deflect spray liquid so as to prevent contact of spray liquid with the gas-forming material before it falls free of the discharge opening of the feed conduit to drop on the liquid surface.

2. Apparatus for generating gas by reacting a dry gas forming material with a liquid which comprises a gas and liquid tight shell for holding a relatively large confined body of the liquid having a free surface at an operating level and extending over the internal cross sectional area of said shell and a quantity of product gas occupying the space in said shell above said free surface; means including a controlled liquid discharge for maintaining said liquid operating level between predetermined limits; means confining and supplying a dry gas-forming material positioned adjacent to said shell and below said operating level; material feeding means comprising a feed screw conveyor within a feed conduit connected gas tightly to the bottom of the material supplying means, extending laterally and upwardly through a gas and liquid sealed aperture in the side of said shell and terminating in a discharge end within the shell substantially above said operating level, said discharge end having an outlet opening with an edge over which the material flows, and the feed screw of the conveyor terminating below said outlet opening edge so that the material is discharged smoothly over the outlet opening edge and pressure surges are avoided; a liquid shield mounted over said discharge outlet opening and liquid sprays at the upper end of said shell above said liquid shield for directing sprays of said liquid downwardly on said entire free liquid surface.

References Cited in the file of this patent
UNITED STATES PATENTS

| | | |
|---|---|---|
| 980,918 | Brousseau | Jan. 10, 1911 |
| 1,148,364 | Duncan et al. | July 27, 1915 |
| 1,184,527 | Harris | May 23, 1916 |
| 2,126,902 | Marshall | Aug. 16, 1938 |
| 2,204,184 | Kojola | June 11, 1940 |
| 2,233,108 | Ness | Feb. 25, 1941 |
| 2,263,658 | Tuel et al. | Nov. 25, 1941 |
| 2,272,979 | Marshall et al. | Feb. 10, 1942 |
| 2,388,916 | Holder | Nov. 13, 1945 |
| 2,409,833 | Burch | Oct. 22, 1946 |
| 2,415,328 | Andersen et al. | Feb. 4, 1947 |